United States Patent
Cho et al.

(10) Patent No.: US 8,805,429 B2
(45) Date of Patent: Aug. 12, 2014

(54) INTER-CELL INTERFERENCE MITIGATING METHOD IN WIRELESS COMMUNICATION SYSTEM AND APPARATUS THEREFOR

(75) Inventors: Han Gyu Cho, Anyang-si (KR); Sung Ho Moon, Anyang-si (KR); Jin Soo Choi, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 13/375,344

(22) PCT Filed: Jun. 1, 2010

(86) PCT No.: PCT/KR2010/003524
§ 371 (c)(1),
(2), (4) Date: Nov. 30, 2011

(87) PCT Pub. No.: WO2010/140830
PCT Pub. Date: Dec. 9, 2010

(65) Prior Publication Data
US 2012/0071182 A1  Mar. 22, 2012

Related U.S. Application Data

(60) Provisional application No. 61/183,086, filed on Jun. 2, 2009.

(51) Int. Cl.
*H04W 72/04* (2009.01)
(52) U.S. Cl.
USPC ........ 455/509; 455/63.1; 455/501; 455/452.1
(58) Field of Classification Search
USPC ........... 455/509, 452.1, 450, 422.1, 447, 446, 455/452.2, 501, 62, 63.1, 67.13; 370/330, 370/436, 329, 252, 281
See application file for complete search history.

(56) References Cited

U.S. PATENT DOCUMENTS

| | | | |
|---|---|---|---|
| 2007/0127359 A1* | 6/2007 | Ahn et al. | 370/208 |
| 2007/0218904 A1* | 9/2007 | Park et al. | 455/436 |
| 2009/0034447 A1* | 2/2009 | Yu et al. | 370/315 |
| 2010/0311452 A1* | 12/2010 | Li et al. | 455/509 |

FOREIGN PATENT DOCUMENTS

| | | |
|---|---|---|
| KR | 2004-0055076 | 6/2004 |
| KR | 2009-0004164 | 1/2009 |
| KR | 2009-0008055 | 1/2009 |
| KR | 2009-0037749 | 4/2009 |

OTHER PUBLICATIONS

International Search Report for PCT/KR2010/003524.

* cited by examiner

*Primary Examiner* — John J Lee
(74) *Attorney, Agent, or Firm* — Morgan, Lewis & Bockius LLP

(57) ABSTRACT

Disclosed is a method for a serving base station in a wireless communication system to mitigate inter-cell interference. More specifically, the method comprises the steps of: allocating a first resource for a terminal existing in a first region in which the coverage of the serving base station and the coverage of a neighboring base station are overlapped with each other; and allocating a second resource with the first resource for a terminal existing in a second region of the coverage of the serving base station, which is outside of the coverage of the neighboring base station. Desirably, the first resource is for the serving base station only with reuse factor of ½, and the second resource is shared with the neighboring base station with reuse factor of 1.

18 Claims, 12 Drawing Sheets

FIG. 6
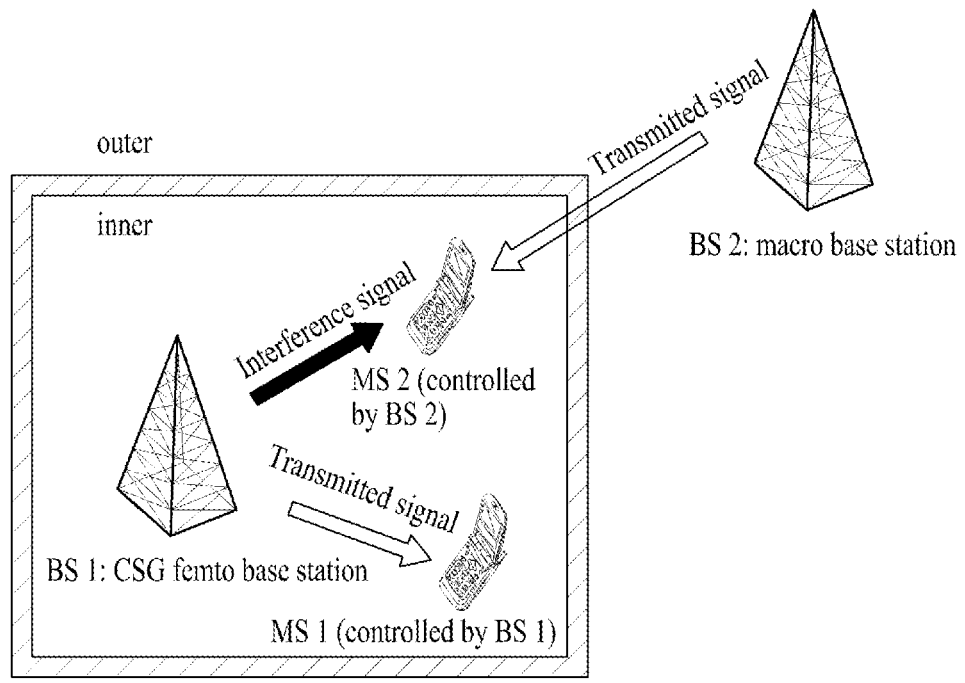
(a) Downlink
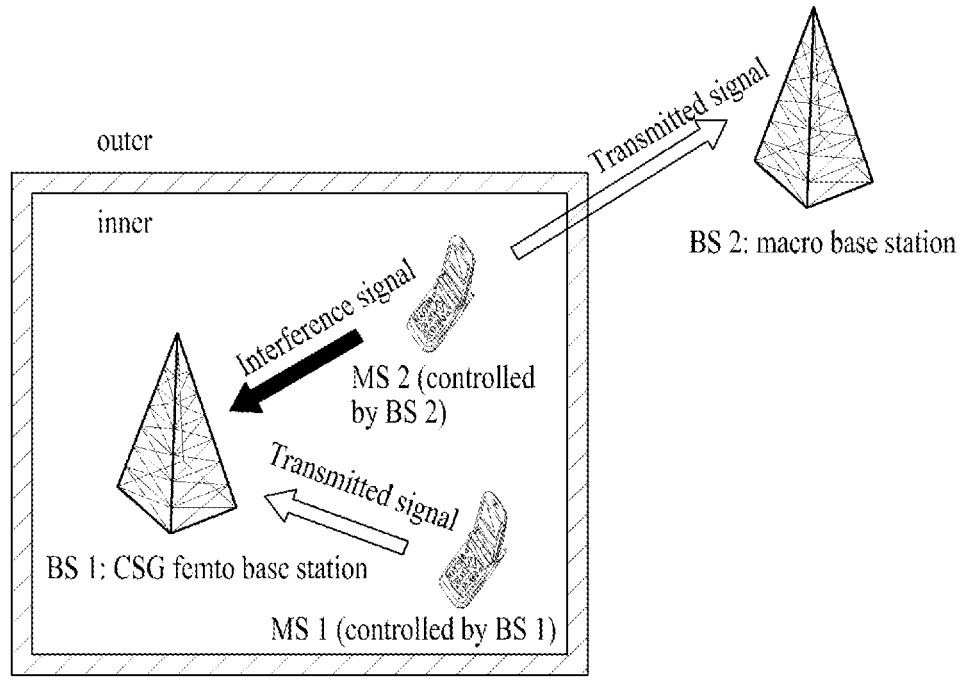
(b) Uplink

INTER-CELL INTERFERENCE MITIGATING METHOD IN WIRELESS COMMUNICATION SYSTEM AND APPARATUS THEREFOR

This application is a national stage application of PCT Application No. PCT/KR2010/003524, filed on Jun. 1, 2010, which claims the benefit of U.S. Provisional Application No. 61/183,086, filed Jun. 2, 2009, all of which are hereby incorporated by reference.

TECHNICAL FIELD

The present invention relates to a wireless communication system, and more particularly, to a method of mitigating inter-cell interference in a wireless communication system and apparatus therefor.

BACKGROUND ART

FIG. 1 shows one example of a wireless communication system. Referring to FIG. 1, a wireless communications system 100 consists of a plurality of base stations 110 and a plurality of mobile stations 120. The wireless communications system 100 can include a homogeneous network or a heterogeneous network. In this case, the heterogeneous network represents the network in which different network entities including macro cells, femto cells, relays and the like coexist. The base station is a fixed station that communicates with a mobile station in general. And, the base stations 110a, 110b and 110c provide services to specific geographical areas 102a, 102b and 102c, respectively. In order to enhance system performance, each of the specific geographical areas can be further divided into a plurality of smaller regions 104a, 104b and 104c for example. Each of the smaller areas can be named a cell, a sector or a segment. In IEEE 802.16e system, a cell identity is given with reference to a whole system. On the contrary, a sector or segment identity is given with reference to a specific area in which each base station provides a service and has a value set to one of 0 to 2. The mobile station 120 is distributed in the wireless communication system in general and may be fixed or movable. Each of the mobile stations is able to communicate with at least one base station at a random moment in uplink ((UL) or downlink (DL). A base station and a mobile station are able to communicate with each other using one of CDMA (code division multiple access) system, FDMA (frequency division multiple access) system, TDMA (time division multiple access) system, SC-FDMA (single carrier frequency division multiple access) system, MC-FDMA (multi carrier frequency division multiple access) system, OFDMA (orthogonal frequency division multiple access) system, a combination thereof and the like. In this specification, 'uplink' may indicate a communication link from a mobile station to a base station. And, 'downlink' may indicate a communication link from a base station to a mobile station.

DISCLOSURE OF THE INVENTION

Technical Task

An object of the present invention is to provide a method of mitigating inter-cell interference in a wireless communication system and apparatus therefore.

Technical tasks obtainable from the present invention are non-limited by the above-mentioned technical tasks. And, other unmentioned Technical tasks can be clearly understood from the following description by those having ordinary skill in the technical field to which the present invention pertains.

Technical Solution

To achieve these and other advantages and in accordance with the purpose of the present invention, as embodied and broadly described, a method of mitigating inter-cell interference, which is mitigated by a serving base station in a wireless communication system, according to one embodiment of the present invention may include the steps of allocating a $1^{st}$ resource for a terminal existing in a first region having a coverage of the serving base station overlap with a coverage of a neighbor base station and allocating a $2^{nd}$ resource for a terminal existing in a $2^{nd}$ region out of the coverage of the neighbor base station within the coverage of the serving base station together with the $1^{st}$ resource. Preferably, the $1^{st}$ resource may include a resource for the serving base station only with a reuse factor of ½ and wherein the $2^{nd}$ resource is shared with the neighbor base station with a reuse factor of 1.

Preferably, the $1^{st}$ resource and the $2^{nd}$ resource may be divided by a frequency partition unit. In this case, the serving base station may communicate with the terminal existing in the $1^{st}$ region using the $1^{st}$ resource set as a specific frequency partition only. Yet, the serving base station and the neighbor base station may need to share frequency partition setting information of a system frequency band. In particular, the frequency partition setting information may include at least one selected from the group consisting of a number of frequency partitions, a bandwidth of each of the frequency partitions and information of resource units configuring the frequency partition. More preferably, the serving base station and the neighbor base station may share information of the frequency partition mapped to the $1^{st}$ resource and the $2^{nd}$ resource.

Alternatively, the $1^{st}$ resource and the $2^{nd}$ resource may be divided by a unit of one selected from the group consisting of a subframe, a frame and a super frame. In this case, the serving base station may communicate with the terminal existing in the $1^{st}$ region using the $1^{st}$ resource set as a specific time resource of one selected from the group consisting of the subframe, the frame and the super frame. In this case, information (specific subframe, frame or super frame information) of a time partition mapped to the $1^{st}$ resource and the $2^{nd}$ resource may be shared between the serving base station and the neighbor base station.

To further achieve these and other advantages and in accordance with the purpose of the present invention, a base station device in a wireless communication system according to another embodiment of the present invention may include a processor allocating a $1^{st}$ resource for a terminal existing in a first region having a coverage of the base station overlap with a coverage of a neighbor base station, the processor allocating a $2^{nd}$ resource for a terminal existing in a $2^{nd}$ region out of the coverage of the neighbor base station within the coverage of the base station together with the $1^{st}$ resource and a radio frequency module configured to communicate with the terminal existing within the coverage of the base station using the allocated resource. Preferably, the $1^{st}$ resource may include a resource for the base station only with a reuse factor of ½ and the $2^{nd}$ resource may be shared with the neighbor base station with a reuse factor of 1.

Advantageous Effect

According to embodiments of the present invention, inter-cell interference within a coverage of a macro base station in a wireless communication system can be efficiently reduced.

Effects obtainable from the present invention are non-limited by the above-mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram for describing an inter-cell interference problem in IEEE 802.16m system.

BEST MODE FOR INVENTION

Reference will now be made in detail to the preferred embodiments of the present invention, examples of which are illustrated in the accompanying drawings. First of all, embodiments of the present invention in the following description are examples for applying the technical features of the present invention to a system that uses a plurality of orthogonal subcarriers. For clarity and convenience of the following description, the present invention is described using IEEE 802.16 system for example. And, the present invention is applicable to various wireless communication system including 3GPP (3rd Generation Partnership Project) system.

Figure 1:
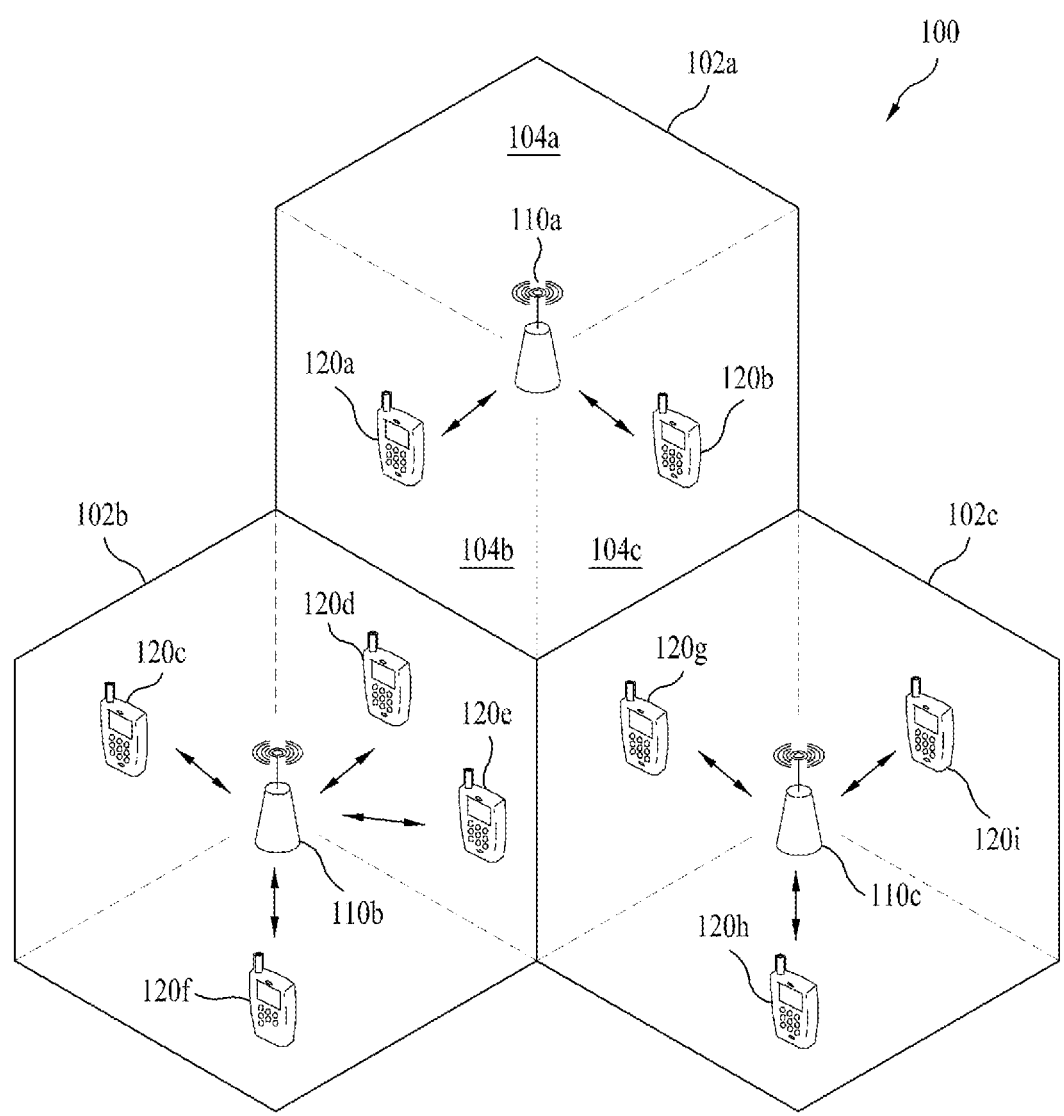
FIG. 1 is a diagram for an example of a wireless communication system.
Figure 2:
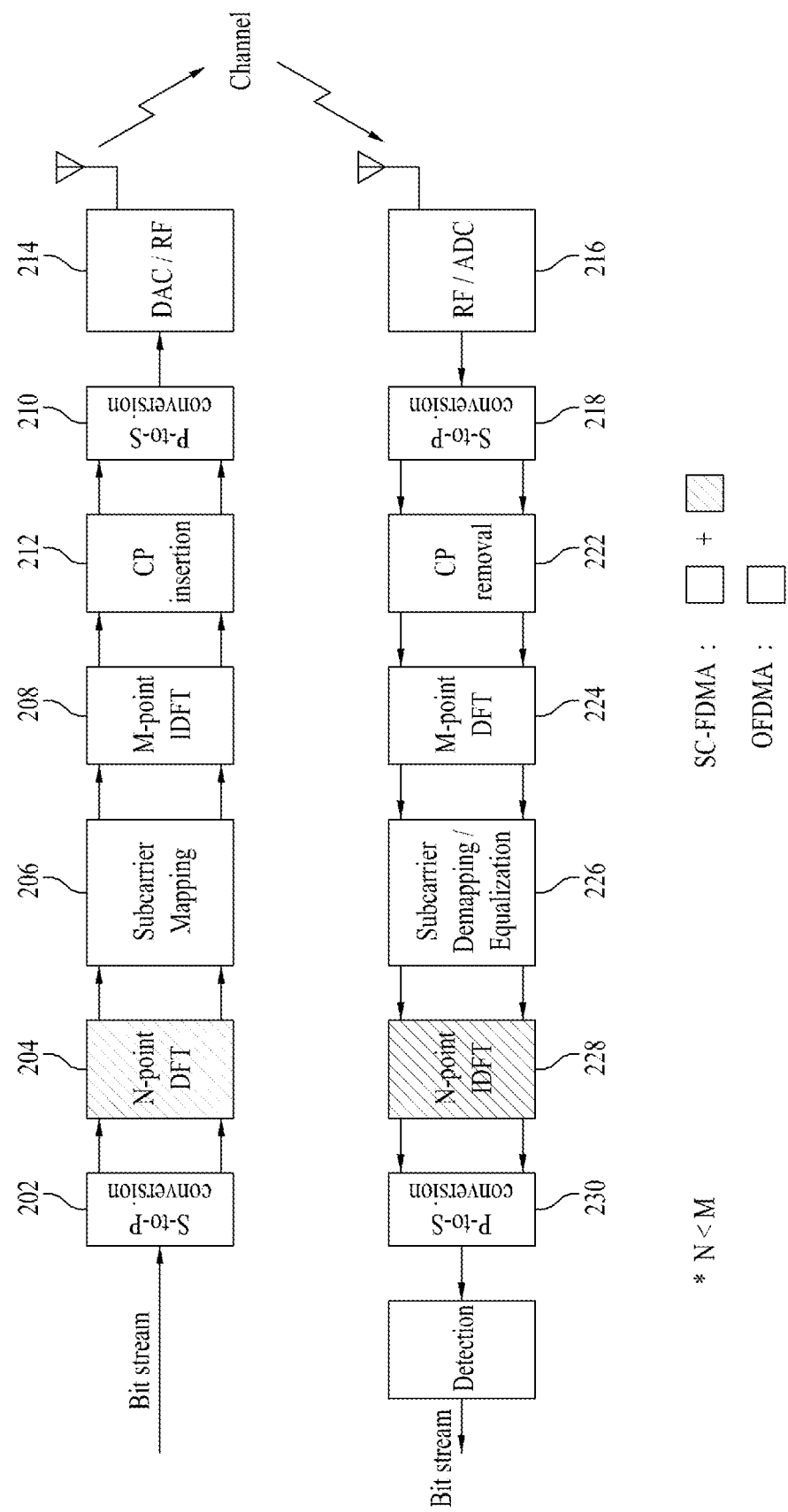
FIG. 2 is a block diagram for an example of a transmitter and receiver for OFDMA and SC-FDMA.

FIG. 2 is a block diagram for an example of a transmitter and receiver for OFDMA and SC-FDMA. In uplink, a transmitter may include a part of a terminal and a receiver may include a part of a base station. In downlink, a transmitter may include a part of a base station and a receiver may include a part of a terminal.

Referring to FIG. 2, an OFDMA transmitter includes a Serial to Parallel converter 202, a subcarrier mapping module 206, an M-point IDFT (Inverse Discrete Fourier Transform) module 208, a cyclic prefix (CP) attaching module 210, a Parallel to Serial converter 212 and an RF/DAC (Radio Frequency/Digital to Analog) converter module 214.

A signal processing process in an OFDMA transmitter is described as follows. First of all, a bitstream is modulated into a data symbol sequence. Particularly, it is able to obtain the bitstream by performing various signal processings including channel encoding, interleaving, scrambling and the like on a data block delivered from a MAC (medium access control) layer. A bitstream is often called a codeword and is equivalent to a data block received from a MAC layer. And, the data block received from the MAC layer can be called a transport block as well. Modulation scheme is non-limited by the above description and can include one of BPSK (Binary Phase Shift Keying), QPSK (Quadrature Phase Shift Keying), n-QAM (n-Quadrature Amplitude Modulation) and the like. Subsequently, a serial data symbol sequence is converted to N data symbols in parallel [202]. The N data symbols are mapped by N subcarriers allocated among total M subcarriers and the (M−N) remaining subcarriers are padded with 0 [206]. The data symbol mapped in a frequency domain is transformed into a time-domain sequence through M-point IDFT processing [208]. Afterwards, in order to reduce inter-symbol interference (ISI) and inter-carrier interference (ICI), OFDMA symbol is generated by adding a cyclic prefix to the time-domain sequence [212]. The OFDMA symbol is then transmitted to a receiver through digital-to-analog conversion, frequency uplink transform and the like [214]. And, available subcarriers among the (M−N) remaining subcarriers are allocated to another user. And, an OFDMA receiver includes an RF/ADC (radio frequency/analog to digital converter) module 216, a serial to parallel converter 218, a CP removing (CP remove) module 220, an M-point DFT (discrete Fourier transform) module 224, a subcarrier demapping/equalization module 226, a parallel to serial converter 228 and a detection module 230. A signal processing process of the OFDMA receiver has a configuration in reverse to that of the OFDMA transmitter.

Meanwhile, compared to the OFDMA transmitter, an SC-FDMA transmitter further includes an N-point DFT module 204 behind the subcarrier mapping module 206. The SC-FDMA transmitter spreads a plurality of data in a frequency domain through DFT prior to IDFT processing, thereby considerably decreasing a PAPR (peak-to-average power ratio) into a level lower than that of OFDMA system. Compared to the OFDMA receiver, an SC-FDMA receiver further includes an N-point IDFT module 228 next to the subcarrier demapping module 226. And, a signal processing process of the SC-FDMA receiver has a configuration in reverse to that of the SC-FDMA transmitter.

The modules exemplarily shown in FIG. 2 are provided for the above description only. The transmitter and/or the receiver may further include at least one necessary module. The modules/functionality may be omitted in part or may be separable into different modules/functionality. At least two of the modules may be integrated into one module.

Figure 3:
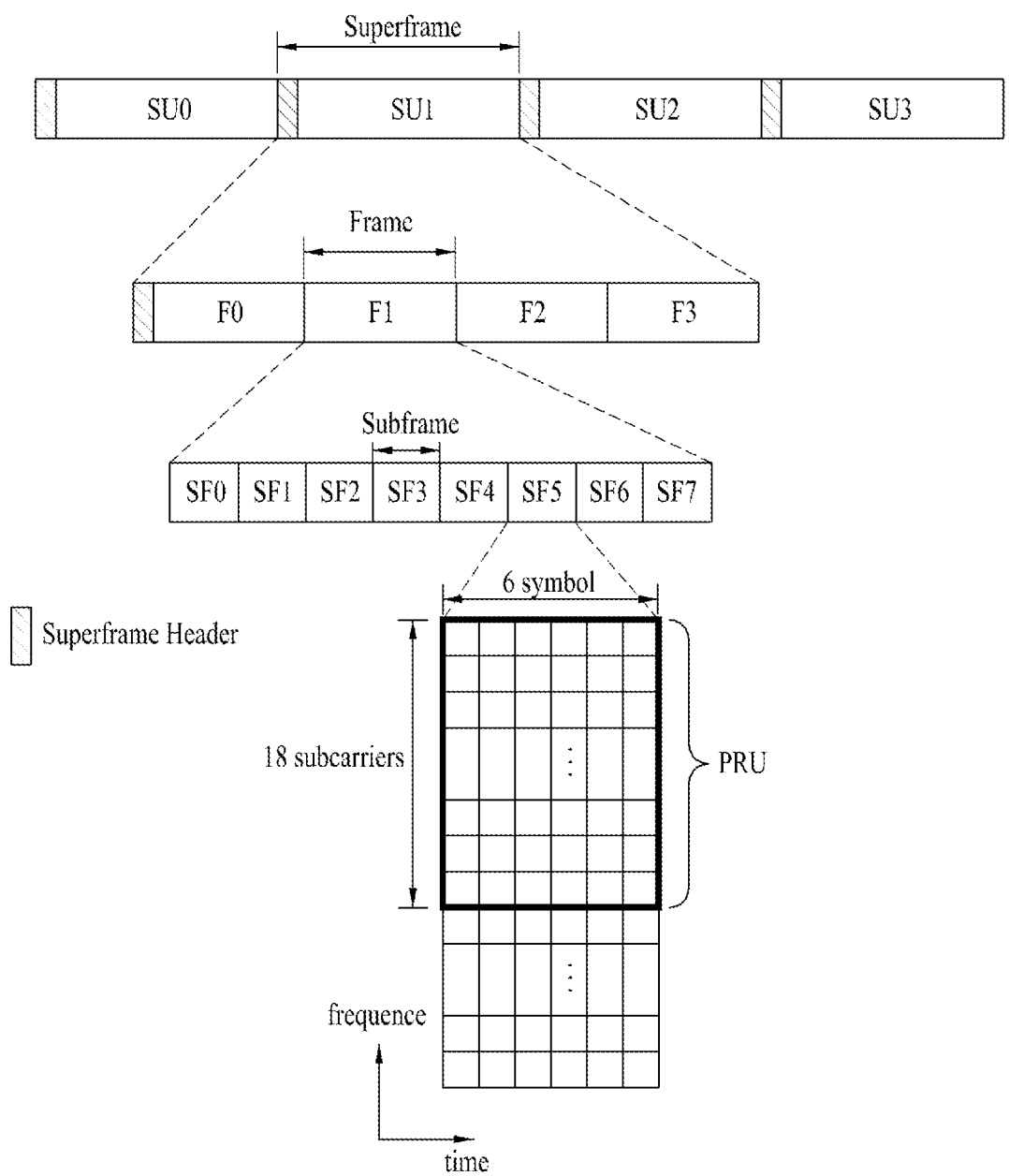
FIG. 3 is a diagram for an example of a radio frame structure in IEEE 802.16m system.

FIG. 3 is a diagram for an example of a radio frame structure in IEEE 802.16m system.

Referring to FIG. 3, a radio frame structure includes 20 ms-superframes SU0 to SU3 capable of supporting 5 MHz, 8.75 MHz, 10 MHz or 20 MHz. The super frame includes 4 5 ms-frames F0 to F3 equal to each other in size and starts with a super frame header (SFH). The super frame header carries an essential system parameter and system configuration information.

One frame includes 8 subframes SF0 to SF7. The subframe is allocated to downlink or uplink transmission. The subframe includes a plurality of OFDM symbols in time domain or includes a plurality of subcarriers in frequency domain. The OFDM symbol can be called OFDMA symbol, SC-FDMA symbol or the like according to a multiple access system. The number of OFDM symbols included in a subframe can be variously modified in accordance with a channel bandwidth, a CP length and the like.

It may be able to define a type of a subframe according to the number of OFDM symbols included in a subframe. For instance, a type-1 subframe can be defined as including 6 OFDM symbols. A type-2 subframe can be defined as including 7 OFDM symbols. A type-3 subframe can be defined as including 5 OFDM symbols. And, a type-4 subframe can be defined as including 9 OFDM symbols. On frame includes subframes of the same type all or subframes differing from each other in type.

OFDM symbol includes a plurality of subcarriers. And, the number of the subcarriers is determined according to a size of FFT (fast Fourier transform). Types of subcarriers can be categorized into a data subcarrier for data transmission, a pilot subcarrier for channel measurement, and a null subcarrier for a guard band and a DC component. Parameters for characterizing an OFDM symbol include BW, $N_{used}$, n, G, etc. The BW is a nominal channel bandwidth. The $N_{used}$ is the number of subcarriers used for signal transmission. The n is a sampling factor and determines subcarrier spacing and a useful symbol time together with BW and $N_{used}$. And, the G indicates a ratio of a CP type to a useful time.

Table 1 shows examples of OFDMA parameters.

A subframe includes a plurality of physical resource units (PRUs) in frequency domain. The PRU is a basic unit for resource allocation and includes a plurality of OFDM symbol consecutive in time domain or a plurality of subcarriers continuous n frequency domain. For instance, the number of OFDM symbols within PRU can be equal to that of OFDM symbols included in a subframe. Hence, the number of OFDM symbols within PRU can be determined according to a type of a subframe. Meanwhile, the number of subcarriers within PRU can be set to 18. In this case, the PRU can be constructed with 6 OFDM symbols×18 subcarriers. The PRU can be called a distributed resource unit (DRU) or a continuous resource unit (CRU) according to a resource allocation scheme.

The above-mentioned structure is exemplarily shown only. Therefore, it may be able to variously modify a super frame length, the number of frames included in a super frame, the number of subframes included in a frame, the number of OFDMA symbols included in a subframe, a parameter of OFDMA symbol and the like. For instance, the number of subframes included in a frame can be variously modified according to a channel bandwidth or a length of CP (cyclic prefix).

Figure 4:
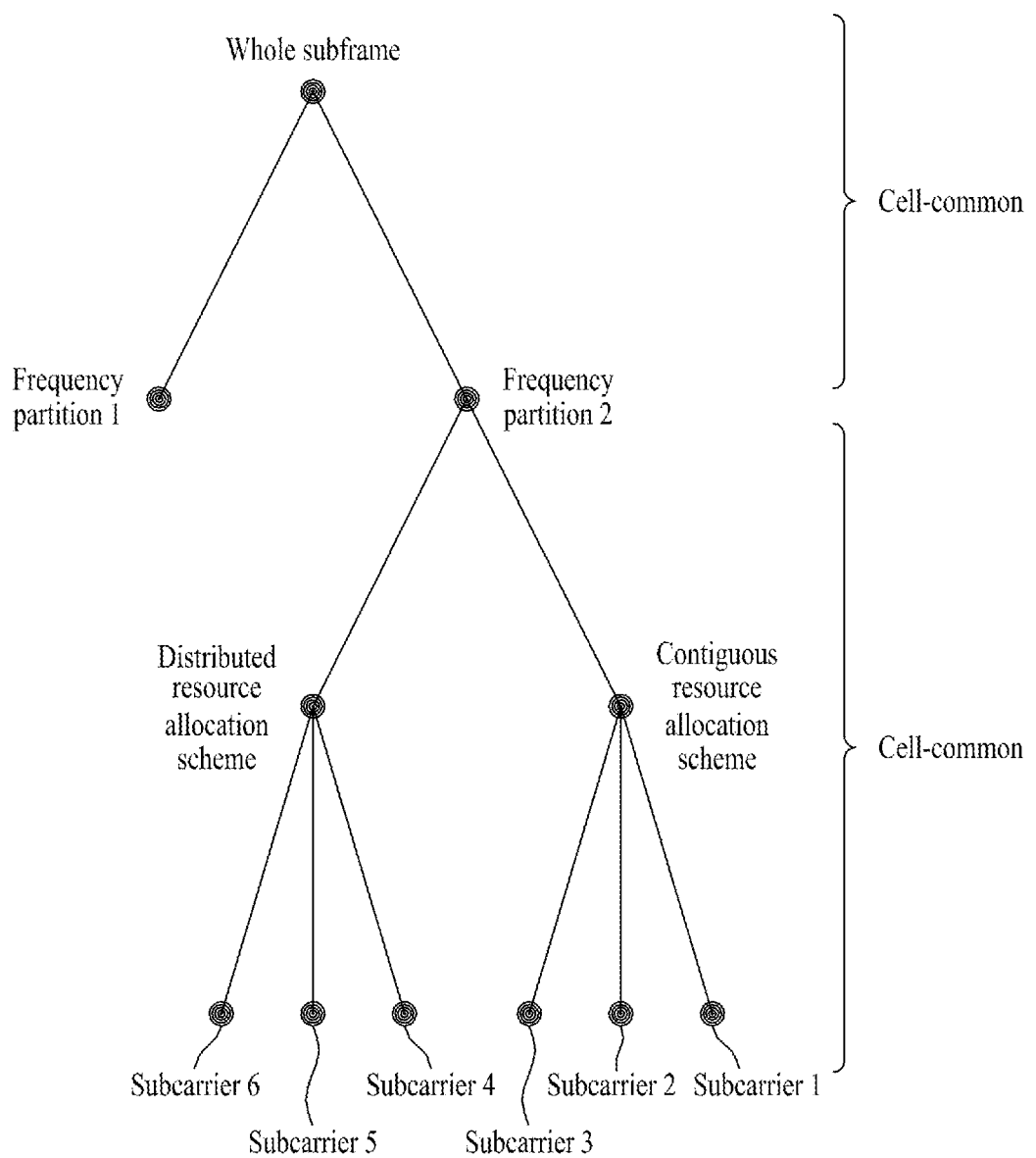
FIG. 4 is a diagram for an example of a physical structure of a subframe in IEEE 802.16m system.

FIG. 4 is a diagram for an example of a physical structure of a subframe in IEEE 802.16m system.

Referring to FIG. 4, a subframe can be partitioned into at least one frequency partition (FP). FIG. 4 shows an example that a subframe is partitioned into 2 frequency partitions, by which the number of frequency partitions may be non-limited.

TABLE 1

| | | 5 | 7 | 8.75 | 10 | 20 |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (µs) | | 91.4 | 128 | 102.4 | 91.4 | 91.4 |
| CP ratio, G = 1/8 | OFDMA symbol time, $T_s$ (µs) | 102.857 | 144 | 115.2 | 102.857 | 102.857 |
| | FDD Number of OFDMA symbols per 5 ms frame | 48 | 34 | 43 | 48 | 48 |
| | Idle time (µs) | 62.857 | 104 | 46.40 | 62.857 | 62.857 |
| | TDD Number of OFDMA symbols per 5 ms frame | 47 | 33 | 42 | 47 | 47 |
| | TTG + RTG (µs) | 165.714 | 248 | 161.6 | 165.714 | 165.714 |
| CP ratio, G = 1/16 | OFDMA symbol time, $T_s$ (µs) | 97.143 | 136 | 108.8 | 97.143 | 97.143 |
| | FDD Number of OFDMA symbols per 5 ms frame | 51 | 36 | 45 | 51 | 51 |
| | Idle time (µs) | 45.71 | 104 | 104 | 45.71 | 45.71 |
| | TDD Number of OFDMA symbols per 5 ms frame | 50 | 35 | 44 | 50 | 50 |
| | TTG + RTG (µs) | 142.853 | 240 | 212.8 | 142.853 | 142.853 |
| CP ratio, G = 1/4 | OFDMA symbol time, $T_s$ (µs) | 114.286 | 160 | 128 | 114.286 | 114.286 |
| | FDD Number of OFDMA symbols per 5 ms frame | 43 | 31 | 39 | 43 | 43 |
| | Idle time (µs) | 85.694 | 40 | 8 | 85.694 | 85.694 |
| | TDD Number of OFDMA symbols per 5 ms frame | 42 | 30 | 38 | 42 | 42 |
| | TTG + RTG (µs) | 199.98 | 200 | 136 | 199.98 | 199.98 |
| Number of Guard Sub-Carriers | Left | 40 | 80 | 80 | 80 | 160 |
| | Right | 39 | 79 | 79 | 79 | 159 |
| Number of Used Sub-Carriers | | 433 | 865 | 865 | 865 | 1729 |
| Number of Physical Resource Unit (18 × 6) in a type-1 sub-frame. | | 24 | 48 | 48 | 48 | 96 |

Each frequency partition includes at least one PRU. A distributed resource allocation scheme and/or a contiguous resource allocation scheme may be applicable to each frequency partition.

A logical resource unit (LRU) is a basic logical unit for the distributed resource allocation and the contiguous resource allocation. A logical distributed resource unit (LDRU) includes a plurality of subcarriers distributed within a frequency band. A size of the LDRU is equal to that of the PRU. The LDRU is generally called a distributed LRU (DLRU). The LCRU (logical contiguous resource unit) includes contiguous subcarriers. A size of the LCRU is equal to that of the PRU. And, the LCRU is generally called a contiguous LRU (CLRU).

Figure 5:
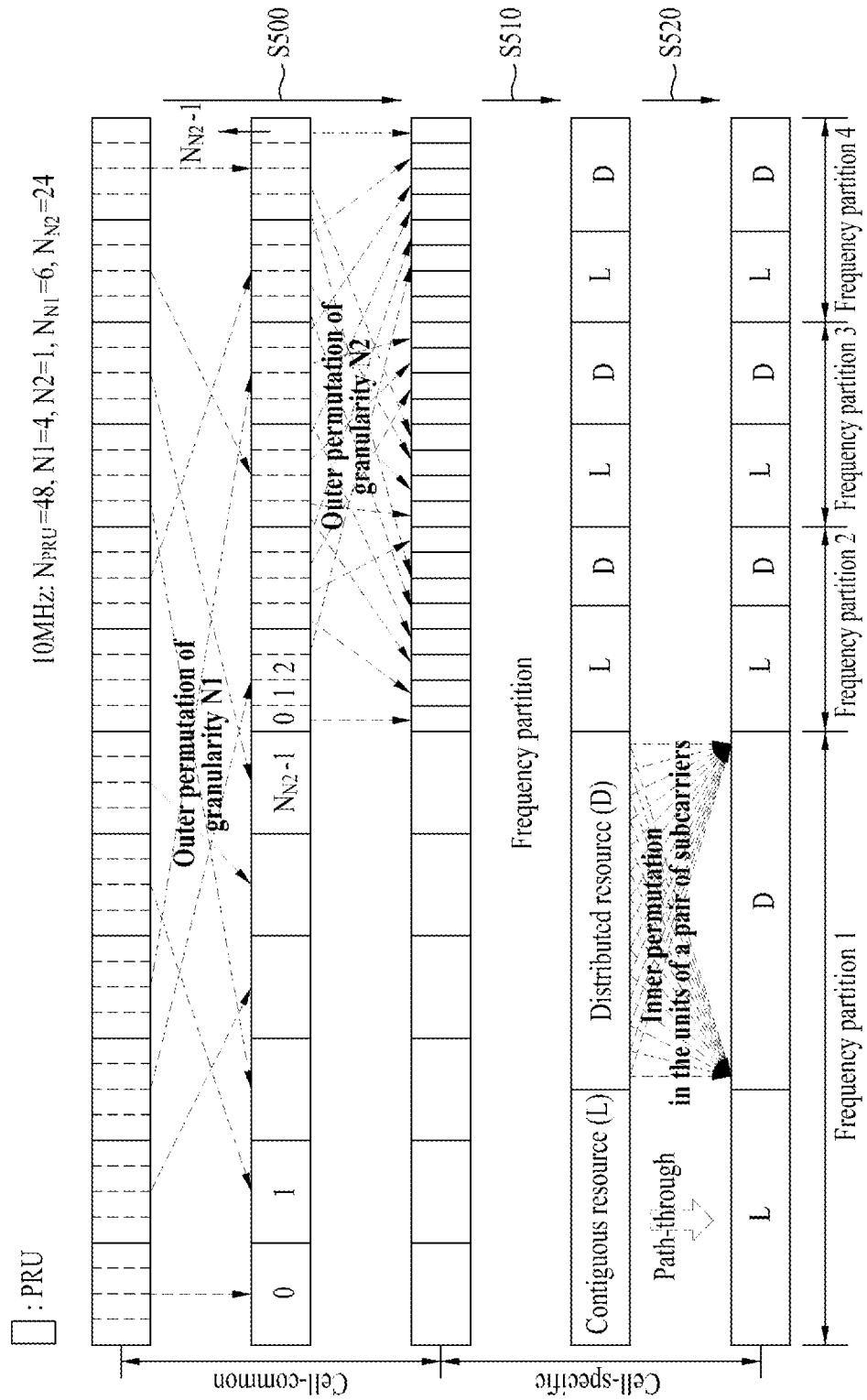
FIG. 5 is a diagram for an example of a process for mapping a resource unit in IEEE 802.16m system.

FIG. 5 is a diagram for an example of a process for mapping a resource unit in IEEE 802.16m system. For clarity, the following assumptions are taken for example of FIG. 5. First of all, an entire frequency band is 10 MHz. The total number of PRUs is 48. $N_1$ is se to 4. The number ($N_{N1}$) of subbands having granularity of $N_1$ is 6. $N_2$ is se to 1. And, the number (1\412) of minibands having granularity of $N_2$ is 24.

Referring to FIG. 5, PRU in a physical region is divided into subband PRU of logical region or miniband PRUs through outer permutation of granularity of $N_1$, and outer permutation is then performed on the miniband PRU with granularity of $N_2$ [S500]. In particular, the outer permutation of the step S500 may be divided into a subband partitioning step of categorizing PRUs in a physical region into subband PRU in logical region and miniband PRU and a miniband permutation step of obtaining diversity gain of the miniband PRU. And, the outer permutation is performed as a cell-common process.

The subband or miniband PRU may be distributed to each frequency partition. And, a process for discriminating contiguous resource L and distributed resource D within the frequency partition is performed [S510]. The process for distributing the subband or miniband PRU to each frequency partition may be performed by being included in or separated from the outer permutation process of the step S500. In case that this process is performed independently, it may be performed based on frequency partition information broadcasted through a super frame header or based on a separate distribution rule.

In order to obtain a diversity gain for the distributed resource, inner permutation may be additionally performed [S520]. In this case, the inner permutation may be performed by a unit of pair and may be called subcarrier permutation.

FIG. 6 is a diagram for describing an inter-cell interference problem in IEEE 802.16m system. In particular, FIG. 6 shows an example of a case that a coverage of a femto base station overlaps within a coverage of a macro base station. In this case, the femto base station ma mean a micro mobile communication base station used in such an indoor space as a home, an office and the like. The femto base station exemplarily shown in FIG. 6 is a CSG (closed subscriber group) femto base station to which a granted user is accessible only. Yet, Although FIG. 6 shows a case that a coverage of the CSG femto base station overlaps within a coverage of the macro base station, any type of a base station, which allows an access for a granted user only as a base station (e.g., a hot zone, a home eNB, etc.) having a small coverage existing within a coverage of the macro base station may cause the above-mentioned inter-cell interference problem as well as the femto base station.

Referring to FIG. 6 (a), a mobile station 1 receives a downlink (DL) signal from a base station 1 which is a CSG femto base station and a mobile station 2 receives a downlink (DL) signal from a base station 2 which is a macro base station. In this case, the mobile station 2 may receive an unintentional signal from the base station 1 due to proximity to the base station 1. If the base station 1 is not a CSG femto base station (i.e., if the base station 1 is a base station to which all users are accessible), the mobile station 2 may be able to improve reception performance by performing a handover into the base station 1 from the base station 2. Yet, if the base station 1 is a CSG femto base station and the mobile station 2 has no authority of an access to the bas station 1, a signal received from the base station 1, as shown in FIG. 6 (a), may be determined as an interference signal by the mobile station 2.

Likewise, referring to FIG. 6 (b), a mobile station 1 transmits an uplink (UL) signal to a base station 1 which is a CSG femto base station and a mobile station 2 transmits an uplink (UL) signal to a base station 2 which is a macro base station. If the base station 1 is the CSG femto base station and the mobile station 2 has no authority of an access to the bas station 1, a signal transmitted to the base station 2, as shown in FIG. 6 (b), may be determined as an interference signal in viewpoints of the base station 1 and the mobile station 1.

In the following description, for clarity, such a station existing within a coverage of a macro base station as a CSG femto base station, a hot zone, a home eNB and the like shall be named an overlaid base station.

In order to mitigate the above-mentioned inter-cell interference, it may be able to consider using a code division multiplexing (CDM) scheme, a frequency division multiplexing (FDM) scheme or a time division multiplexing (TDM) scheme. Yet, in case of the code division multiplexing scheme, when signals received/transmitted from/to a macro base station or an overlaid base station lose balance in power, the signals may be still recognized as interferences to cause a problem of practicality. Therefore, the present invention considers the frequency division multiplexing and the time division multiplexing.

Figure 7:
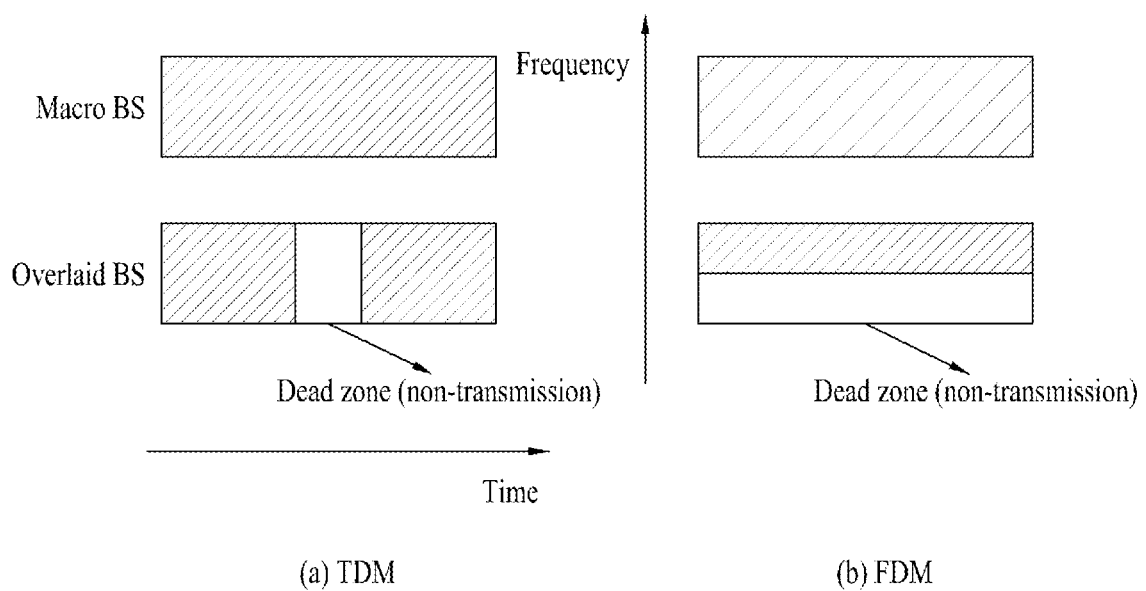
FIG. 7 is a conceptional diagram for describing a method of mitigating inter-cell interference according to an embodiment of the present invention.

FIG. 7 is a conceptional diagram for describing a method of mitigating inter-cell interference according to an embodiment of the present invention. In particular, FIG. 7 (a) shows a case of using a time division multiplexing scheme and FIG. 7 (b) shows a case of using a frequency division multiplexing scheme.

Referring to FIG. 7 (a), an overlaid base station may be able to set a dead zone (i.e., non-transmission region) in a time domain. In particular, the overlaid base station may be set to transceive signals in a time except the dead zone with a mobile station controlled by the overlaid base station only. In this case, a macro base station may be able to transceive signals with a mobile station, which generates the interference, in the time domain corresponding to the dead zone of the overlaid base station only.

Likewise, referring to FIG. 7 (b), an overlaid base station may be able to set a dead zone (i.e., non-transmission region) in a frequency domain. In particular, the overlaid base station may be set to transceive signals only with a mobile station controlled by the overlaid base station using a frequency domain except the dead zone. In this case, a macro base station may be able to transceive signals with a mobile station, which generates the interference, in the frequency domain corresponding to the dead zone of the overlaid base station only.

Although the concept of mitigating inter-cell interference using the time division multiplexing scheme or the frequency division multiplexing scheme, it may be able to consider setting a specific frequency domain within a specific time domain to a dead zone in a manner of combining the time division multiplexing scheme and the frequency division multiplexing scheme together.

Yet, the reduction of transceiving efficiency, which may be generated due to the dead zone setting may be improved by applying the following concepts of FFR (fractional frequency reuse) and FTR (fractional time reuse).

In the following description, an inter-cell interference mitigating method using FFR (fractional frequency reuse) is explained.

Figure 8:
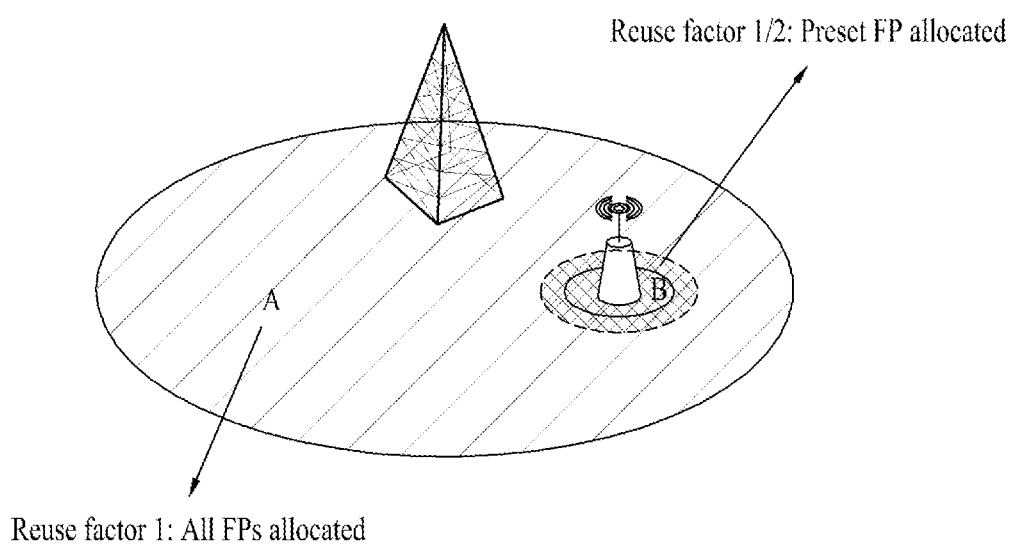
FIG. 8 is a diagram for describing a method of mitigating inter-cell interference according to one embodiment of the present invention.

FIG. 8 is a diagram for describing a method of mitigating inter-cell interference according to one embodiment of the present invention.

Referring to FIG. 8, a macro base station and an overlaid base station may be able to share such resource unit setting of frequency partition as frequency partition information (e.g., a frequency partition index, a bandwidth of each frequency partition, the number of allocated subbands, etc.) with each other. In this case, a mobile station, which is controlled by a macro base station existing within a coverage of an overlaid base station, may be set to transceive a signal with the macro base station via a frequency partition preset with a reuse factor of ½.

Meanwhile, the frequency partition preset with the reuse factor of ½ may be set 'dynamic' in a following manner. First of all, a mobile station detects an inter-cell interference and then reports it to a macro base station. Secondly, the macro base station requests an overlaid base station to occupy a preset frequency partition for the macro base station only. Alternatively, the frequency partition may be implemented 'static' in a manner that the frequency partition is set in the course of performing a bandwidth setting between a macro base station and an overlaid base station in case of establishing a cell. Alternatively, it may be able to consider that the frequency partition is implemented 'semi-static'.

Figure 9:
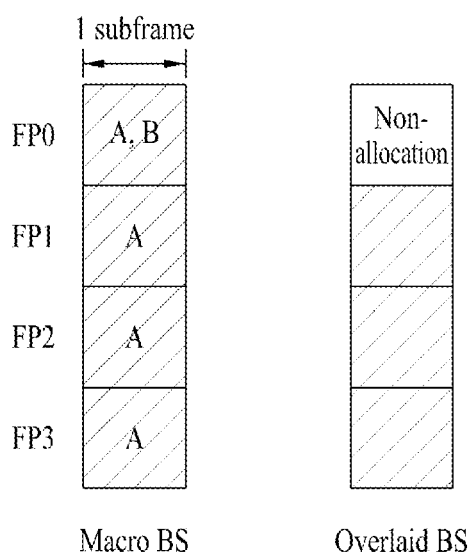
FIG. 9 is a diagram for an example of frequency partition setting to perform an inter-cell interference mitigating method according to one embodiment of the present invention.

FIG. 9 is a diagram for an example of frequency partition setting to perform an inter-cell interference mitigating method according to one embodiment of the present invention. In particular, FIG. 9 shows an example on the assumption that a coverage B of an overlaid base station is located at a central part of a macro base station, as shown in FIG. 8.

The following description is made with reference to FIG. 8 and FIG. 9. First of all, frequency partitions 1 to 3 are the regions allocated to both a macro base station and an overlaid base station with a reuse factor of 1. Yet, a frequency partition 0 is a region allocated to a macro base station only with a reuse factor of ½ and may be set not to be allocated to an overlaid base station. Hence, the overlaid base station transceives signals with mobile stations controlled by the overlaid base station via the frequency partitions 1 to 3. And, the macro base station transceives signals with mobile stations, which are located in a region A failing to overlap with a coverage of the overlaid base station and controlled by the macro base station, via all frequency partitions. Yet, the macro base station transceives signals with mobile stations, which are located in a region B overlapping with the coverage of the overlaid base station and controlled by the macro base station, via the frequency partition 0 only.

Meanwhile, if a coverage of an overlaid base station is located on an edge of a coverage of a macro base station, it may be able to set the frequency partition 1 to be allocated not to the overlaid base station but to the macro base station only with a reuse factor of ½

In the following description, an inter-cell interference mitigating method using FTR (fractional time reuse) is described.

Figure 10:
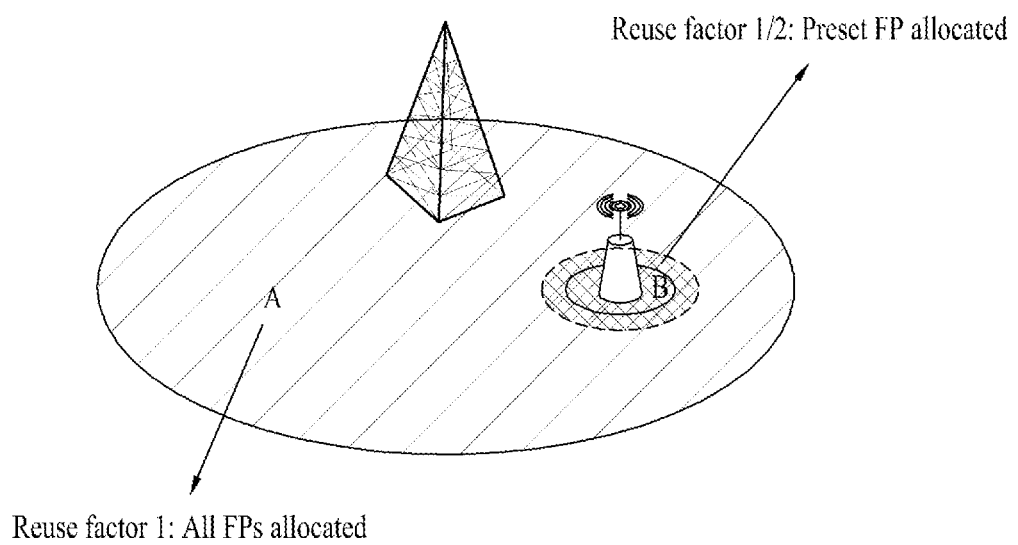
FIG. 10 is a diagram for describing a method of mitigating inter-cell interference according to another embodiment of the present invention.

FIG. 10 is a diagram for describing a method of mitigating inter-cell interference according to another embodiment of the present invention.

Referring to FIG. 10, a mobile station controlled by a macro base station existing within a coverage of an overlaid base station may be set to transceive a signal with the macro base station via a subframe preset with a reuse factor of ½. Yet, in case of applying the FTR concept, the macro base station and the overlaid base station need not to share information on frequency partition, which is different from the FFR applied case. Likewise, the subframe preset with the reuse factor of ½ may be set dynamic, static or semi-static between the macro base station and the overlaid base station.

Figure 11:
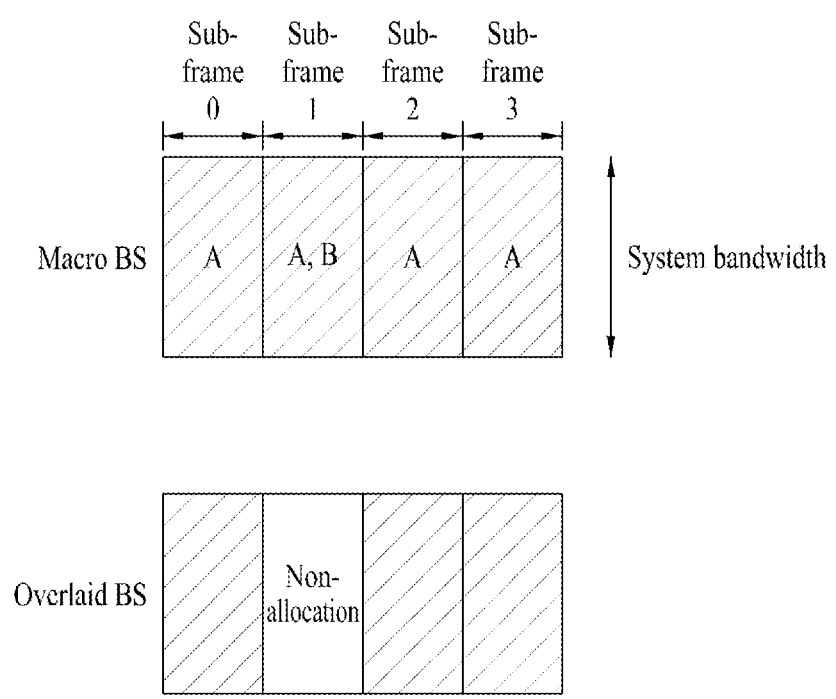
FIG. 11 is a diagram for an example of subframe setting to perform an inter-cell interference mitigating method according to another embodiment of the present invention.

FIG. 11 is a diagram for an example of subframe setting to perform an inter-cell interference mitigating method according to another embodiment of the present invention. In particular, FIG. 11 shows an example on the assumption that a coverage B of an overlaid base station is located at a central part of a macro base station, as shown in FIG. 10.

The following description is made with reference to FIG. 10 and FIG. 11. First of all, subframes 0, subframe 2 and subframe 3 are the regions allocated with a reuse factor of 1 to enable both a macro base station and an overlaid base station to transceive signals. Yet, a subframe 1 is a region allocated to a macro base station only with a reuse factor of ½ and may be set not to be allocated to an overlaid base station. Hence, the overlaid base station transceives signals with mobile stations controlled by the overlaid base station via the subframes 0, 2 and 3. And, the macro base station transceives signals with mobile stations, which are located in a region A failing to overlap with a coverage of the overlaid base station and controlled by the macro base station, via all subframes. Yet, the macro base station transceives signals with mobile stations, which are located in a region B overlapping with the coverage of the overlaid base station and controlled by the macro base station, via the subframe 1 only.

Although FIG. 10 and FIG. 11 apply the FTR concept to implement the reuse factor of ½ by a subframe unit, it is apparent that the FTR concept can be applied by a unit of frame or super frame.

In the above description, the FFR concept and the FTR concept are separately applied to implement the embodiments for mitigating the inter-cell interference. Moreover, the embodiment may be implemented in a manner that a specific frequency partition is allocated to either a macro base station or an overlaid base station in a specific subframe (or frame/superframe) by combining the FFR concept and the FTR concept with each other.

Figure 12:
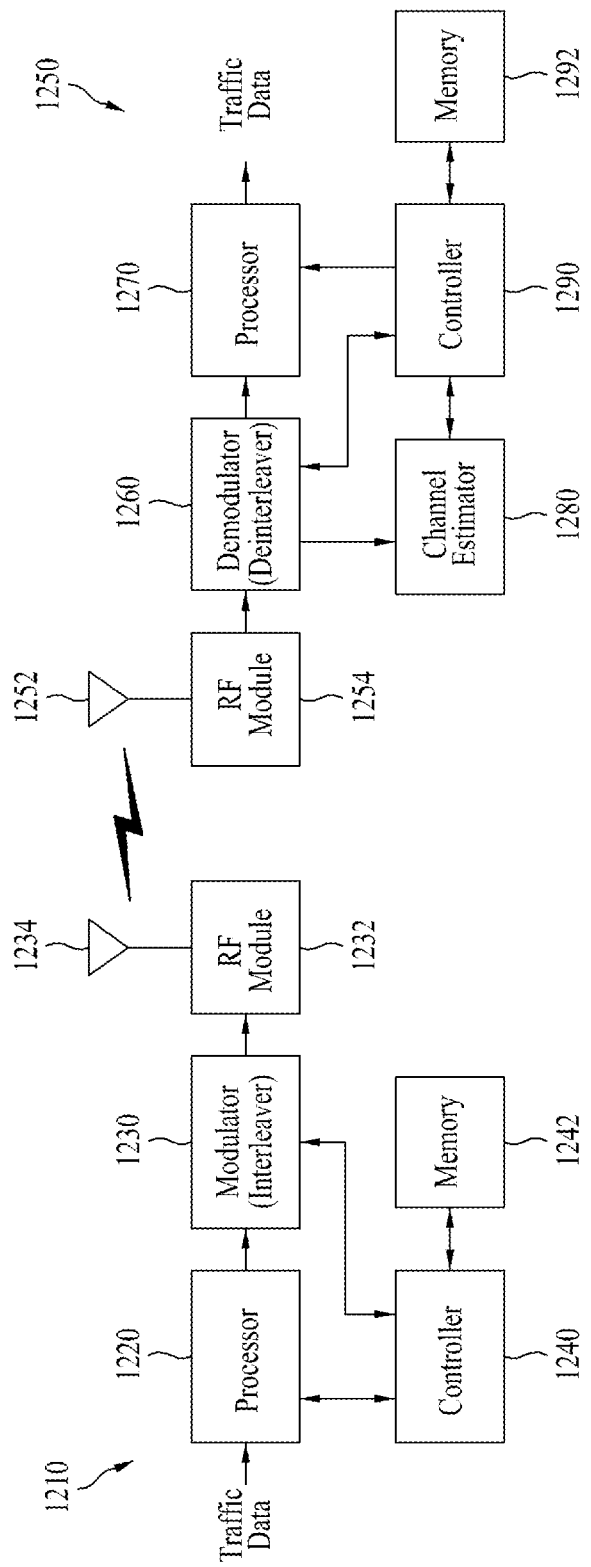
FIG. 12 is a block diagram for an example of a transmitter and receiver according to one embodiment of the present invention.

FIG. 12 is a block diagram for an example of a transmitter and receiver according to one embodiment of the present invention. In downlink, a transmitter 1210 is a part of a base station and a receiver 1250 is a part of a mobile station. In uplink, a transmitter 1210 is a part of a mobile station and a receiver 1250 is a part of a base station.

In the transmitter 1210, a processor 1220 generates data symbols by performing encoding, interleaving and symbol mapping on data e.g., traffic data and signaling). And, the processor 1220 generates pilot symbols and then multiplexes data and pilot symbols with each other.

A modulator 1230 generates transmission symbols according to a wireless access scheme. The wireless access scheme includes one of FDMA, TDMA, CDMA, SC-FDMA, MC-FDMA, OFDMA and combinations thereof. And, the modulator 1230 enables data to be transmitted by being distributed in a frequency region using one of various permutation schemes proposed by embodiments of the present invention. A radio frequency (RF) module 1232 generates an RF signal from a transmission symbol through an antenna 1234 by performing signal processing (e.g., analog conversion, amplification, filtering and frequency uplink transform).

An antenna 1252 of the receiver 1250 receives a signal transmitted by the transmitter 1210 and then forwards it to an RF module 1254. The RF module 1254 provides input samples by performing signal processing (e.g., filtering, amplification, frequency downlink transform, digitalization, etc.) on the received signal.

A demodulator 1260 provides a data value and a pilot value by demodulating the input samples. A channel estimator 1280 derives a channel estimation value based on the received pilot values. The demodulator 1260 performs data detection (or equalization) on the received data values using the channel estimation value and then provides data symbol estimation values for the transmitter 1210. Moreover, the demodulator 1260 is able to rearrange the data distributed in frequency and time domains into data arranged in original order by performing operations reverse to the corresponding one of the various permutation schemes proposed by the embodiments of the present invention. A processor 1270 performs symbol demapping, deinterleaving and decoding on the data symbol estimation values and then provides decoded data.

Generally, the processings by the demodulator 1260 and the Rx data processor 1270 in the receiver 1250 are mutually supplemented with the processings of the modulator 1230 and the Processor 1220 in the transmitter, respectively.

A controller/processor 1240/1290 monitors and controls operations of the modules existing in the transmitter/receiver 1210/1250. And, program codes and data for the transmitter/receiver 1210/1250 are saved in a memory 1242/1292.

According to one embodiment of the present invention, in case that the transmitter 1210 and the receiver 1250 are parts of a base station, the processors 1220 and 1270 of the transmitter 1210 and the receiver 1250 may be set to transceive signals with a mobile station, which is controlled by a macro base station existing within a coverage of an overlaid base station, and the macro base station via a frequency partition preset with a reuse factor of ½. In this case, the macro base station and the overlaid base station may be able to share such resource unit setting of frequency partition as frequency partition information (e.g., a frequency partition index, a bandwidth of each frequency partition, the number of allocated subbands, etc.) with each other.

According to another embodiment of the present invention, in case that the transmitter 1210 and the receiver 1250 are parts of a base station, the processors 1220 and 1270 of the transmitter 1210 and the receiver 1250 may be set to transceive signals with a macro base station via a subframe preset with a reuse factor of ½ for a mobile station controlled by the macro base station existing within a coverage of an overlaid base station.

Thus, the subframe preset with the reuse factor of ½ may be set dynamic, static or semi-static between the macro base station and the overlaid base station.

The modules exemplarily shown in FIG. 12 are provided for the description. The transmitter and/or the receiver can further include necessary module(s). The modules/functions may be omitted in part or separated into different modules. And, at least two of the modules may be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be described based on the data transmission and reception between a terminal and a base station. A specific operation which has been described as being performed by the base station may be performed by an upper node of the base station as the case may be. In other words, it is apparent that various operations performed for communication with the user equipment in the network which includes a plurality of network nodes along with the base station can be performed by the base station or network nodes other than the base station. The base station may be replaced with such a term as a fixed station, a Node B, an eNode B (eNB), an access point and the like. Also, the terminal may be replaced with such a term as a user equipment (UE), a mobile station (MS), a mobile subscriber station (MSS) and the like.

The embodiments according to the present invention can be implemented by various means, for example, hardware, firmware, software, or their combination. If the embodiment according to the present invention is implemented with hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented with firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Accordingly, the present invention is applicable to a wireless communication system, and more particularly, to a wireless mobile communication device used for a cellular system.

What is claimed is:
1. A method of mitigating inter-cell interference, which is mitigated by a serving base station in a wireless communication system, the method comprising:
allocating a 1st resource for a terminal existing in a 1st region having a coverage of the serving base station overlap with a coverage of a neighbor base station; and allocating a 2nd resource for a terminal existing in a 2nd region out of the coverage of the neighbor base station within the coverage of the serving base station together with the 1st resource, wherein the 1st resource comprises a resource for the serving base station only with a reuse factor of ½ and wherein the 2nd resource is shared with the neighbor base station with a reuse factor of 1.

2. The method of claim 1, wherein the 1st resource and the 2nd resource are divided by a frequency partition unit.

3. The method of claim 2, wherein the serving base station communicates with the terminal existing in the 1st region using the 1st resource set as a specific frequency partition only.

4. The method of claim 2, wherein the serving base station and the neighbor base station share frequency partition setting information of a system frequency band.

5. The method of claim 4, wherein the frequency partition setting information comprises at least one selected from the group consisting of a number of frequency partitions, a bandwidth of each of the frequency partitions and information of resource units configuring the frequency partition.

6. The method of claim 4, wherein the serving base station and the neighbor base station share information of the frequency partition mapped to the 1st resource and the 2nd resource.

7. The method of claim 1, wherein the 1st resource and the 2nd resource are divided by a unit of one selected from the group consisting of a subframe, a frame and a super frame.

8. The method of claim 7, wherein information (specific subframe, frame or super frame information) of a time partition mapped to the 1st resource and the 2nd resource are shared between the serving base station and the neighbor base station.

9. The method of claim 7, wherein the serving base station communicates with the terminal existing in the 1st region using the 1st resource set as a specific time resource of one selected from the group consisting of the subframe, the frame and the super frame.

10. In a wireless communication system, a base station device comprising:

a processor allocating a 1st resource for a terminal existing in a 1st region having a coverage of the base station overlap with a coverage of a neighbor base station, the processor allocating a 2nd resource for a terminal existing in a 2nd region out of the coverage of the neighbor base station within the coverage of the base station together with the 1st resource; and a radio frequency module configured to communicate with the terminal existing within the coverage of the base station using the allocated resource, wherein the 1st resource comprises a resource for the base station only with a reuse factor of ½ and wherein the 2nd resource is shared with the neighbor base station with a reuse factor of 1.

11. The base station device of claim 10, wherein the 1st resource and the 2nd resource are divided by a frequency partition unit.

12. The base station device of claim 11, wherein the radio frequency module communicates with the terminal existing in the 1st region using the 1st resource set as a specific frequency partition only.

13. The base station device of claim 11, wherein the base station and the neighbor base station share frequency partition setting information of a system frequency band.

14. The base station device of claim 13, wherein the frequency partition setting information comprises at least one selected from the group consisting of a number of frequency partitions, a bandwidth of each of the frequency partitions and information of resource units configuring the frequency partition.

15. The base station device of claim 13, wherein the base station and the neighbor base station share information of the frequency partition mapped to the 1st resource and the 2nd resource.

16. The base station device of claim 10, wherein the 1st resource and the 2nd resource are divided by a unit of one selected from the group consisting of a subframe, a frame and a super frame.

17. The base station device of claim 16, wherein the radio frequency module communicates with the terminal existing in the 2nd region using the 2nd resource set as a specific time resource of one selected from the group consisting of the subframe, the frame and the super frame.

18. The base station device of claim 16, wherein information (specific subframe, frame or super frame information) of a time partition mapped to the 1st resource and the 2nd resource are shared between the base station and the neighbor base station.

* * * * *